(12) United States Patent
Zakowski

(10) Patent No.: US 9,635,982 B2
(45) Date of Patent: May 2, 2017

(54) FOOD PROCESSOR HAVING REMOVABLE FEED TUBE

(71) Applicant: Joseph W. Zakowski, New Canann, CT (US)

(72) Inventor: Joseph W. Zakowski, New Canann, CT (US)

(73) Assignee: CONAIR CORPORATION, Stamford, CT (US)

( * ) Notice: Subject to any disclaimer, the term of this patent is extended or adjusted under 35 U.S.C. 154(b) by 99 days.

(21) Appl. No.: 14/245,359

(22) Filed: Apr. 4, 2014

(65) Prior Publication Data
US 2014/0299693 A1 Oct. 9, 2014

Related U.S. Application Data

(60) Provisional application No. 61/809,557, filed on Apr. 8, 2013.

(51) Int. Cl.
*A47J 43/00* (2006.01)
*A47J 43/07* (2006.01)

(52) U.S. Cl.
CPC ................. *A47J 43/0716* (2013.01)

(58) Field of Classification Search
CPC .................................. A47J 43/0716
USPC ................................ 241/92, 285.2
See application file for complete search history.

(56) References Cited

U.S. PATENT DOCUMENTS

| | | | | |
|---|---|---|---|---|
| 5,819,641 A * | 10/1998 | Hsu | ........................ | A47J 19/027 241/282.1 |
| 7,587,974 B2 * | 9/2009 | Cohen | ................. | A47J 43/0716 426/231 |
| 7,721,908 B2 * | 5/2010 | Cronin | ................... | B65D 43/12 220/345.1 |
| 8,087,603 B2 * | 1/2012 | Kolar | .................. | A47J 43/0716 181/198 |
| 8,146,490 B2 * | 4/2012 | Obersteiner | .......... | A47J 19/027 241/273.2 |
| 8,387,520 B2 * | 3/2013 | Backus | ................. | A47J 19/027 241/37.5 |
| 2004/0000565 A1 * | 1/2004 | Nicholas | ............ | A47G 19/2205 222/142.9 |
| 2004/0112906 A1 * | 6/2004 | von Holdt, Jr. | ..... | B65D 21/0233 220/657 |
| 2005/0127086 A1 * | 6/2005 | Bradshaw | ........... | A47J 43/0794 221/144 |
| 2006/0130676 A1 * | 6/2006 | Cohen | ................. | A47J 43/0716 99/511 |
| 2008/0089170 A1 * | 4/2008 | Larsen | .................. | A47J 43/046 366/192 |
| 2008/0149639 A1 * | 6/2008 | Luburic | ............. | B65D 21/0233 220/276 |

(Continued)

*Primary Examiner* — Faye Francis
(74) *Attorney, Agent, or Firm* — Grogan, Tuccillo & Vanderleeden, LLP

(57) ABSTRACT

A food processor having a removable feed tube is provided. The food processor includes a work bowl and a lid configured to be selectively removable from the work bowl and having a feed tube opening. A removable feed tube is selectively attached to the lid and extends upwards from the feed tube opening when attached to the lid. The food processor also includes a simple cover that can be utilized in place of the removable feed tube to close off the feed tube opening.

11 Claims, 9 Drawing Sheets

(56) References Cited

U.S. PATENT DOCUMENTS

| | | | |
|---|---|---|---|
| 2010/0200075 A1* | 8/2010 | Thurlow | A47J 36/04 137/14 |
| 2011/0000869 A1* | 1/2011 | Braun | B65D 1/023 215/40 |
| 2011/0031246 A1* | 2/2011 | Massey, Jr. | B65D 43/0249 220/214 |
| 2011/0155733 A1* | 6/2011 | Luburic | B65D 21/0233 220/254.1 |
| 2013/0233181 A1* | 9/2013 | Allen | A47J 27/04 99/337 |

* cited by examiner

FOOD PROCESSOR HAVING REMOVABLE FEED TUBE

CROSS-REFERENCE TO RELATED APPLICATIONS

This application claims the benefit of U.S. Provisional Application Ser. No. 61/809,557, filed on Apr. 8, 2013, which is herein incorporated by reference in its entirety.

FIELD OF THE INVENTION

The present invention relates to food processors and, more particularly, to a food processor having a removable feed tube.

BACKGROUND OF THE INVENTION

Food processing devices providing a number of different types of food preparations, such as mixing, grinding, chopping, slicing, grating, shredding, or other processing operations, are well known. Existing food processing devices typically include a base housing an electric motor, a drive shaft driven by the motor, a bowl receivable on the base and a lid or cover having a feed tube releasably mounted to the bowl. A rotatably driven blade is mounted to the drive shaft to process one or more food items inside the bowl.

While existing food processing devices are generally suitable for what is regarded as ordinary performance, there is room for improvement in terms of ease of use and functionality.

SUMMARY OF THE INVENTION

It is an object of the present invention to provide a food processor having a removable feed tube.

These and other objects are achieved by the present invention.

According to an embodiment of the present invention, a food processor having a removable feed tube is provided. The food processor includes a work bowl and a lid configured to be selectively removable from the work bowl and having a feed tube opening. A removable feed tube is selectively attached to the lid and extends upwards from the feed tube opening when attached to the lid. The food processor also includes a simple cover that can be utilized in place of the removable feed tube to close off the feed tube opening.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
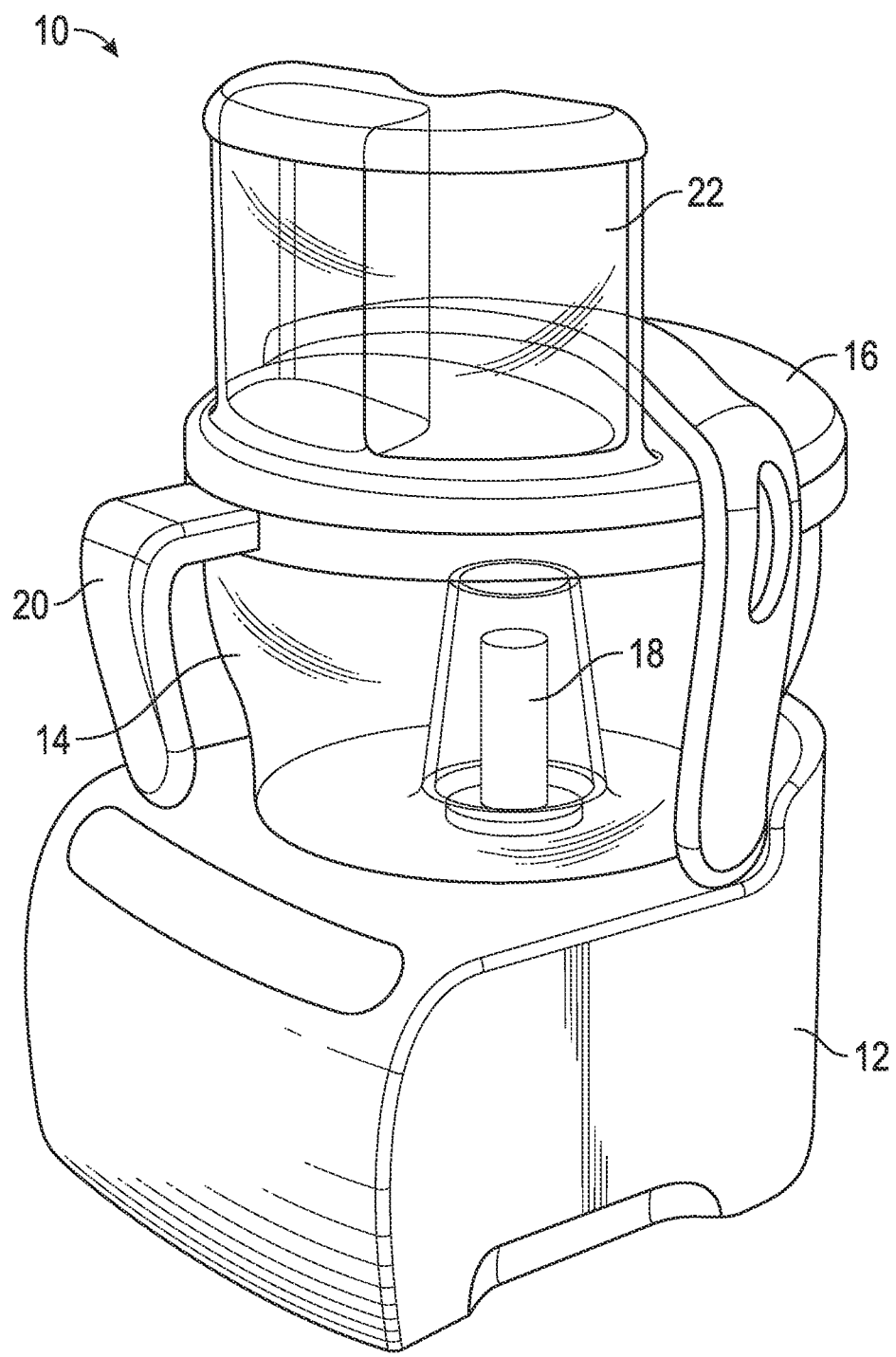
FIG. 1 is a perspective view of a food processor according to an embodiment of the present invention.

Referring to FIG. 1, a food processor 10 according to the present invention is shown. The food processor 10 includes a base 12, a work bowl or receptacle 14 received on the base 12, and a lid 16 configured to be selectively removable from the work bowl 14. Base 12 includes a motor or other rotary drive mechanism (not shown) connected to a rotatable output shaft 18 for rotatably driving a blade interior to the work bowl 14 and may include controls (not shown) for varying settings of the motor.

As further shown therein, work bowl 14 is generally cylindrical or frusto-conical in shape and has a handle 20 and a pour spout (not shown). The lid 16 defines a substantially circular body sized and is dimensioned to cover work bowl 14. The lid 16 also includes a feed tube opening (not shown). The feed tube opening may be generally oval in shape, although other shapes and dimensions are envisioned without departing from the broader aspects of the present invention.

As best shown in FIG. 1, the lid 16 may also include a feed tube 22 defining a substantially annular body having a substantially oval cross-section extending upwards from the lid 16 and in communication with the feed tube opening. As is well known in the art, the feed tube 22 provides a chute through which a user may load food items to be processed into the work bowl 14.

Figure 2:
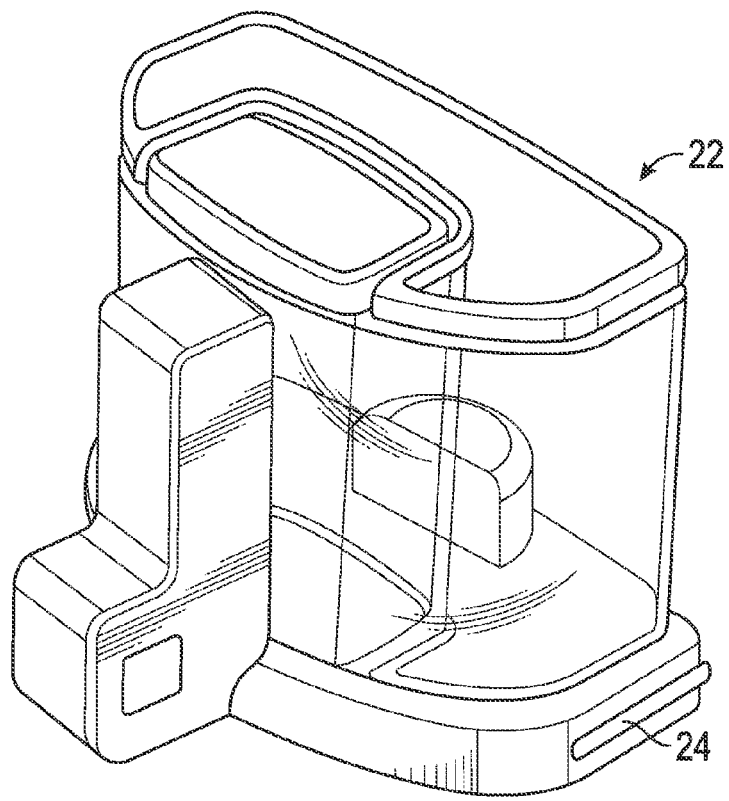
FIG. 2 is a perspective view of a removable feed tube according to an embodiment of the present invention.

With reference to FIG. 2, a perspective view of a removable feed tube 22 is shown. As shown therein, the feed tube 22 is a substantially annular body and has a pair of raised ridges or tongues 24 on opposed sides thereof. The tongues 24 are configured to be slidably received in corresponding grooves 26 formed in the frame 28 of the lid 16 that defines the feed tube opening 30. These grooves 26 in the lid 16 are best show in FIG. 3. As shown therein, a cross-section of the feed tube 22 is sized and shaped to correspond to the size and shape of the feed tube opening 30. In operation, a user may align the tongues 24 of the removable feed tube 22 with the grooves 26 in the lid 16 and slide the tongues 24 into the grooves 26 such that the feed tube 22 is in communication with the feed tube opening 30 and extends upwards therefrom.

Figure 3:
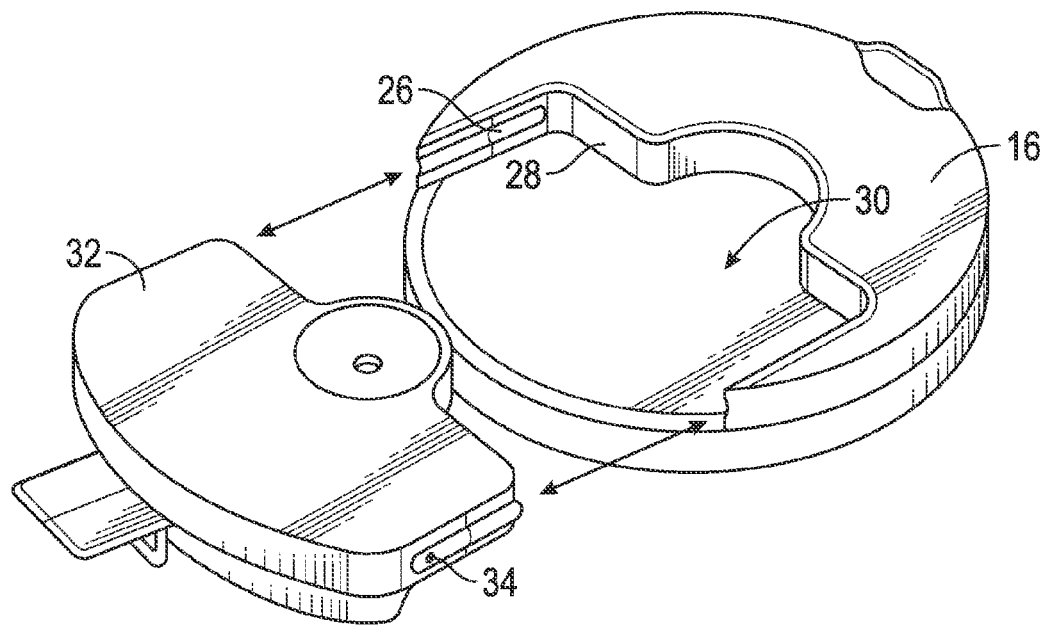
FIG. 3 is an perspective view of a lid and feed tube opening cover according to an embodiment of the present invention.
Figure 4:
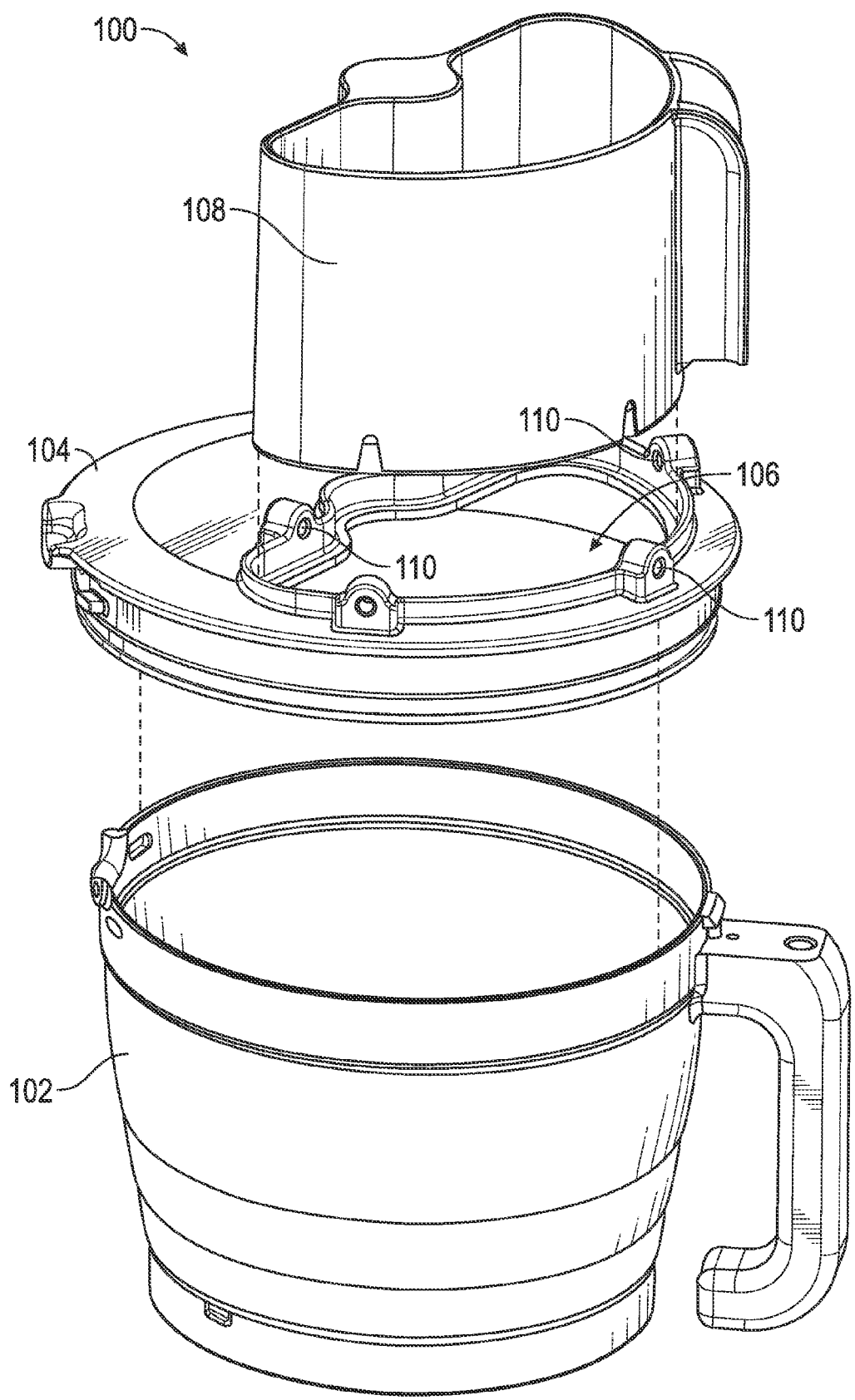
FIG. 4 is an exploded, perspective view of a food processor having a removable feed tube according to another embodiment of the present invention.
Figure 5:
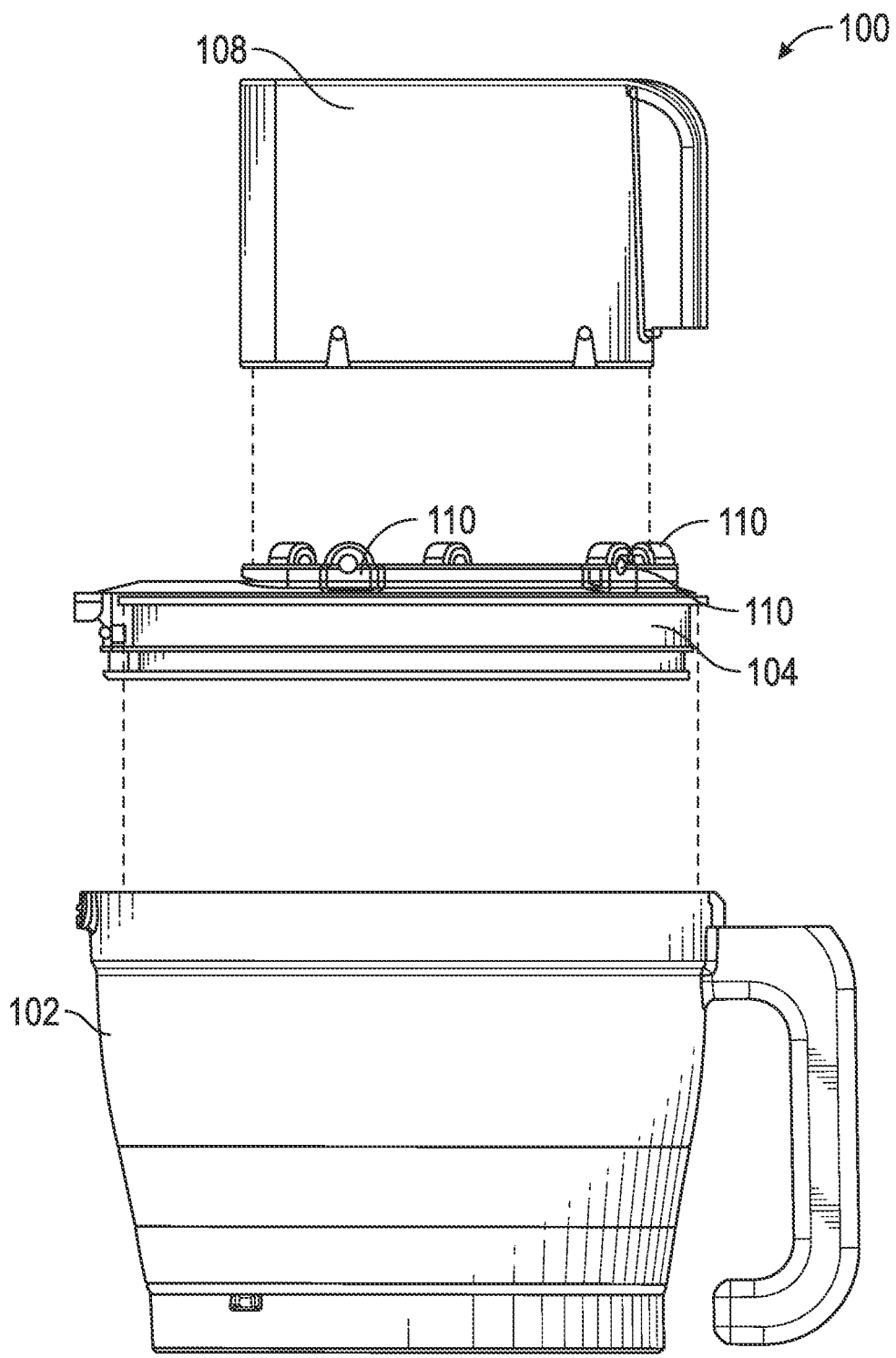
FIG. 5 is a side, elevational view of the food processor having a removable feed tube of FIG. 4.
Figure 6:
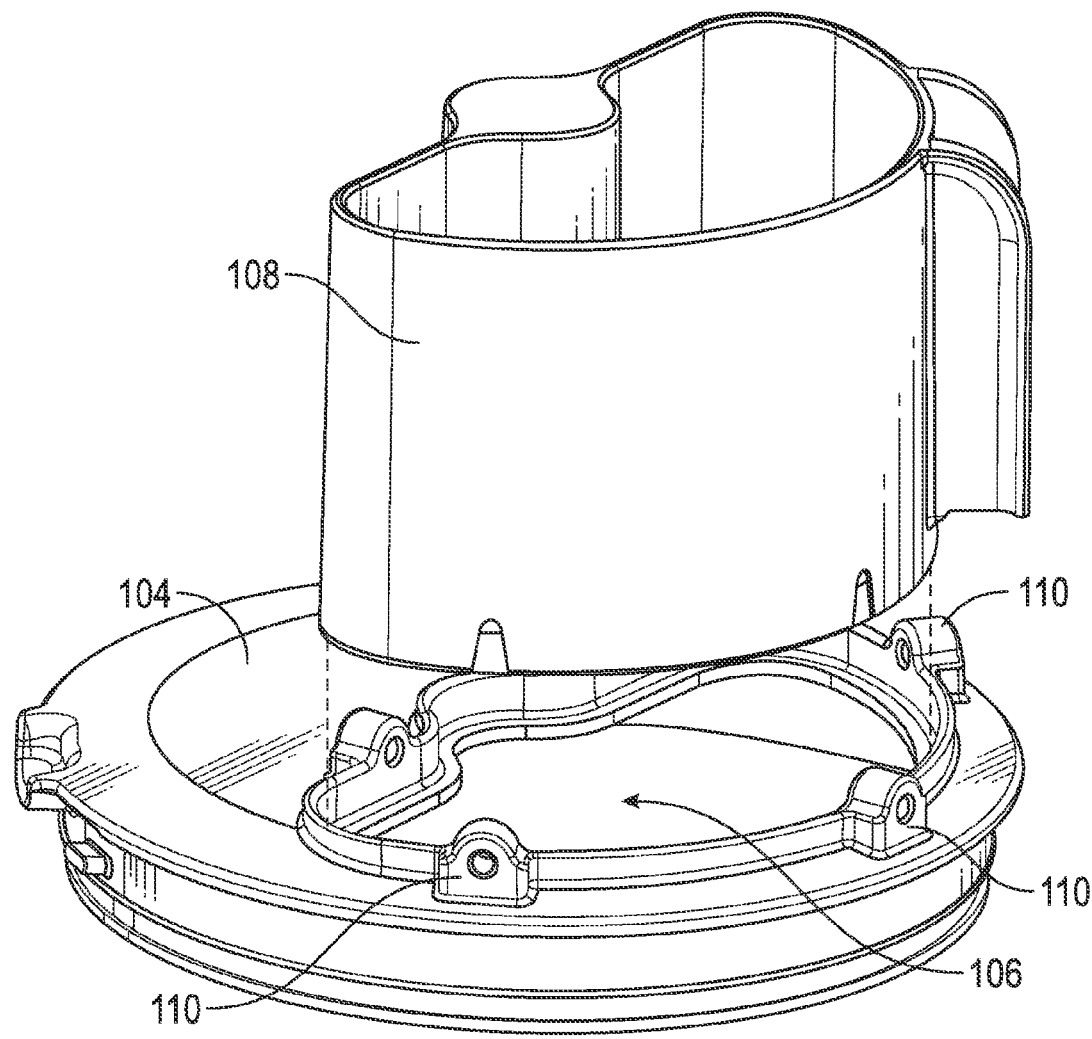
FIG. 6 is an enlarged, perspective view of a lid and removable feed tube of the food processor of FIG. 4.
Figure 7:
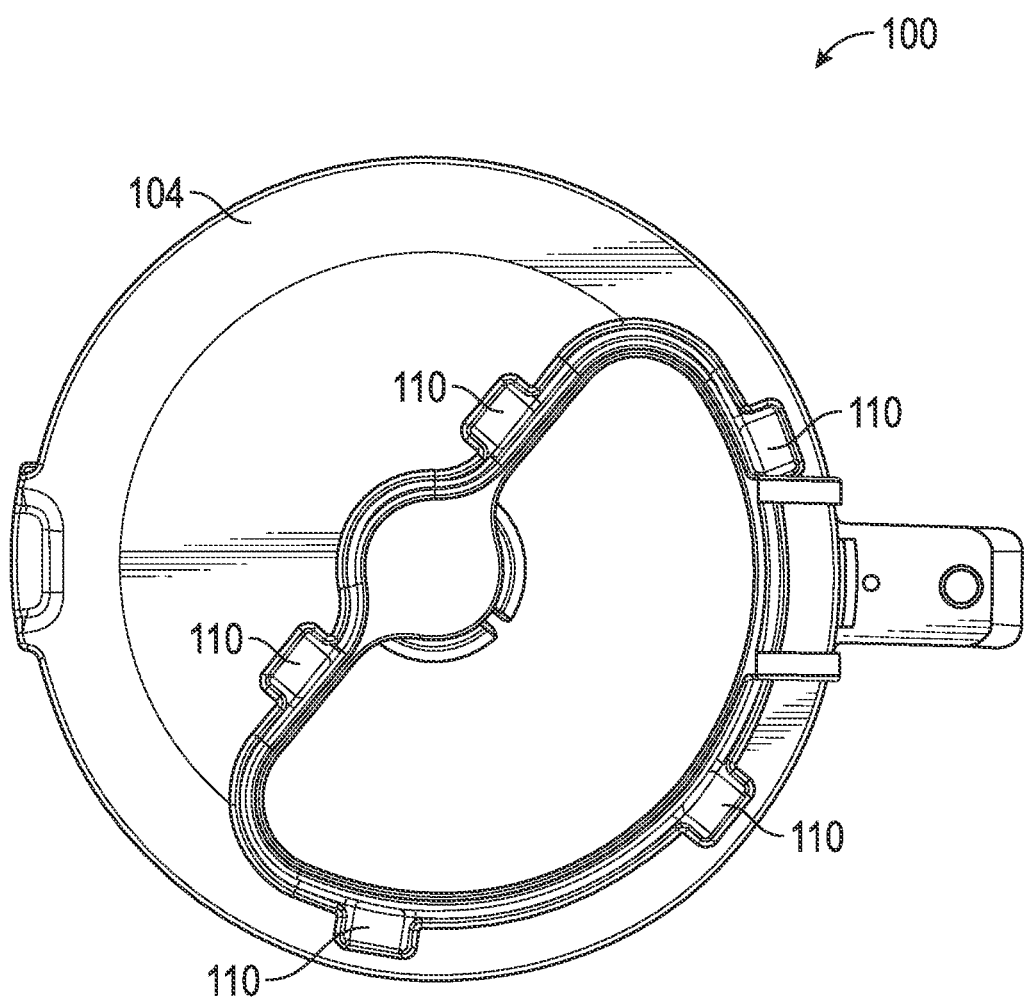
FIG. 7 is a top, plan view of the food processor having a removable feed tube of FIG. 4.
Figure 8:
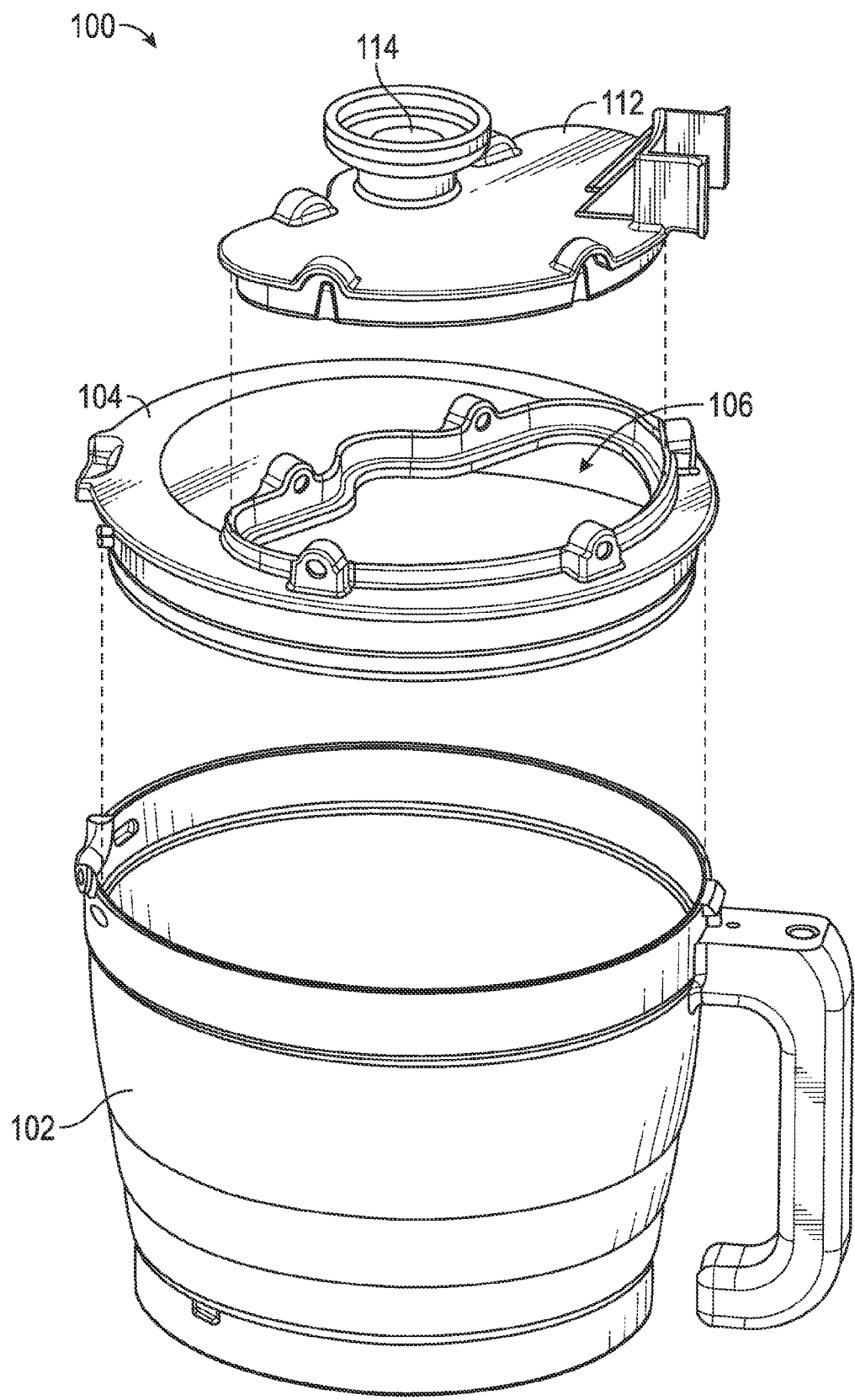
FIG. 8 is an exploded, perspective view of the food processor of FIG. 4, illustrating a cover for the feed tube opening.
Figure 9:
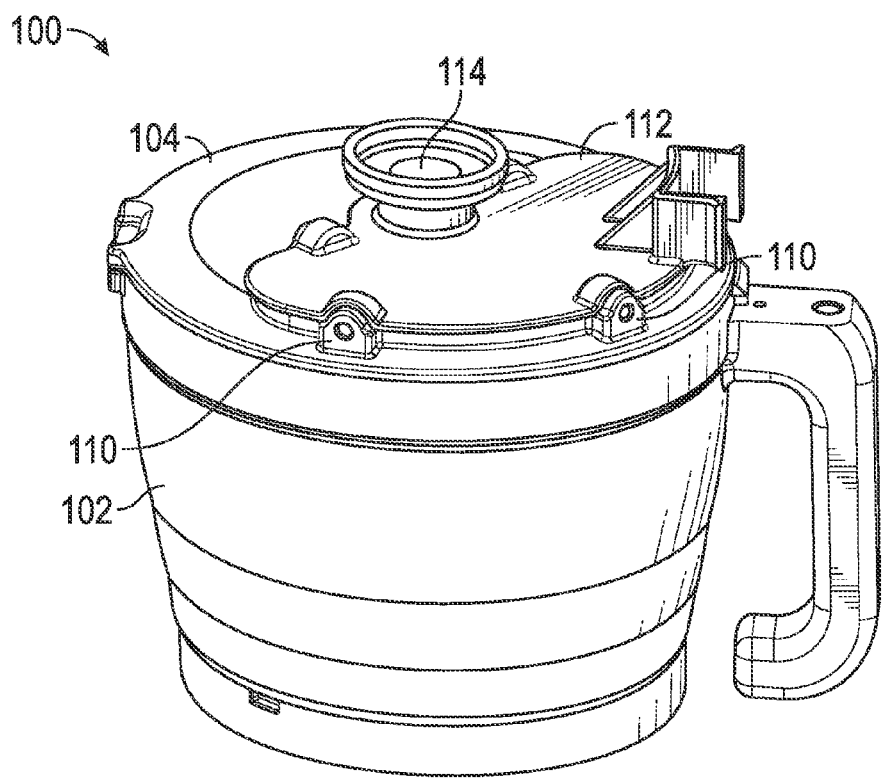
FIG. 9 is a perspective view of the food processor of FIG. 4, illustrating a cover in place over the feed tube opening.
Figure 10:
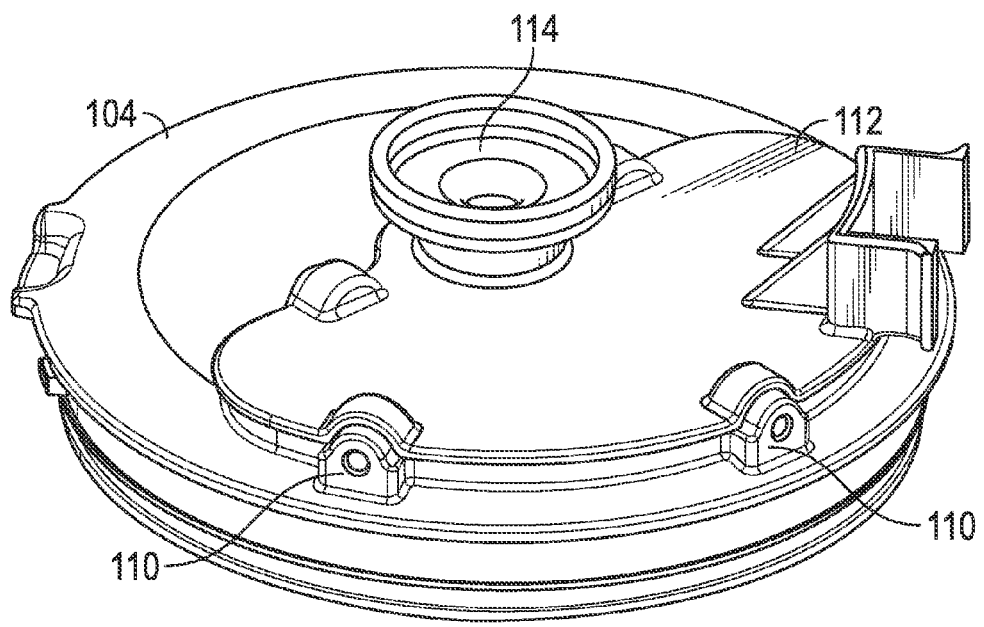
FIG. 10 is an enlarged, perspective view of the lid of the food processor of FIG. 4, illustrating a cover in place over the feed tube opening.
Figure 11:
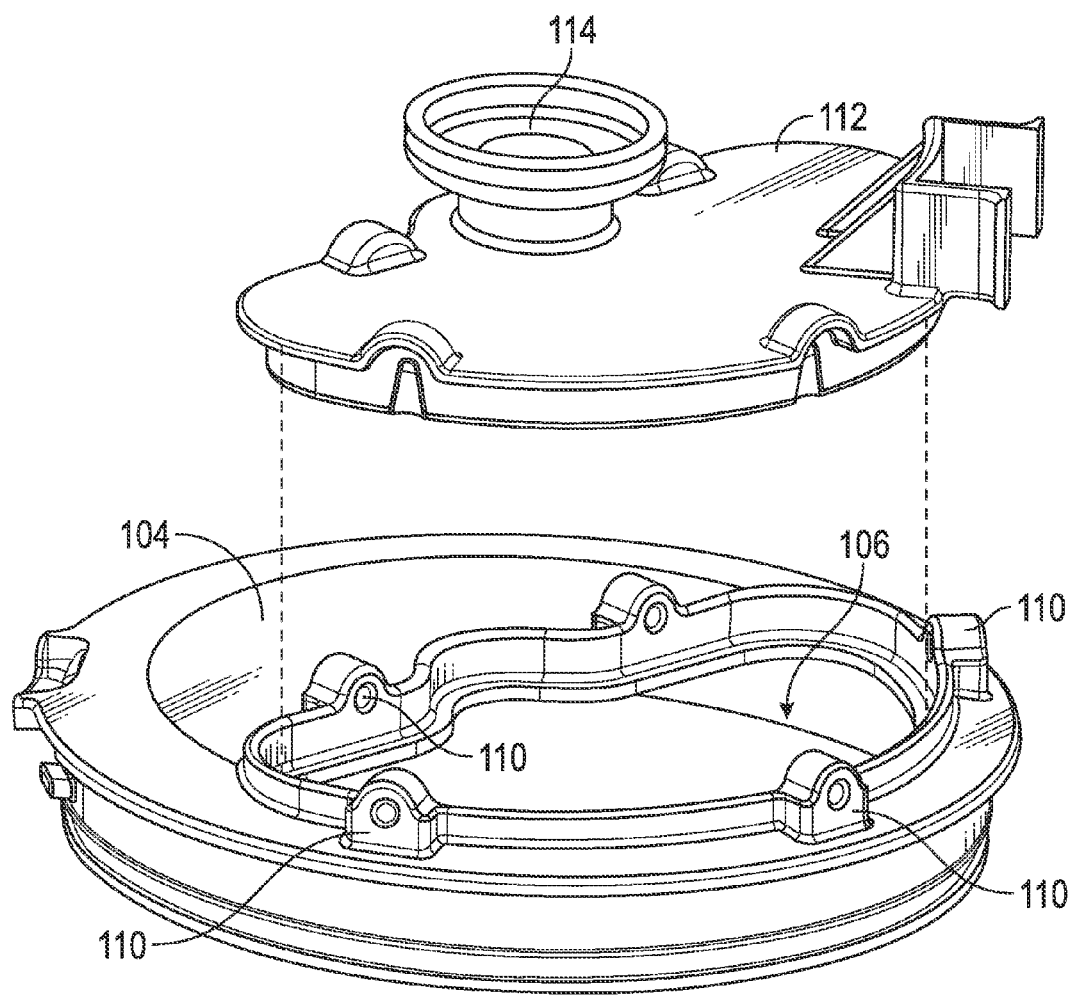
FIG. 11 is another perspective view of the lid of the food processor of FIG. 4, illustrating a cover for closing off the feed tube opening.

With specific reference to FIG. 3, a simple cover 32 may be placed over the feed tube opening 30 when the feed tube 22 is not utilized. As shown therein, the cover 32 is generally planar and includes a pair of opposed tongues 34 substantially similar to tongues 24 on the removable feed tube 22. The tongues 34 are configured to be slidably received by grooves 26 in the lid. As shown therein, the cover 32 is sized and shaped to correspond to the size and shape of the feed tube opening 30. In operation, a user may align the tongues 34 of the cover 32 with the grooves 26 in the lid 16 and slide the tongues 34 into the grooves 26, as shown in FIG. 3, such that the cover 32 closes off the feed tube opening 30.

Turning now to FIGS. 4-7 an alternative food processor 100 having a removable feed tube is shown. As with the food processor 10 described above, food processor 100 includes a work bowl 102 and a lid 104 configured to be selectively attached to the work bowl 102. The lid 16 includes a frame defining a feed tube opening 106 and removable feed tube 108 defining a substantially annular body configured to be releasably attached to the lid 104 and extending upwards from the feed tube opening 106.

As shown therein, removable feed tube 108 may be positioned on the lid 104 over the feed tube opening 106 and secured in place via pins provided through locating and anchoring apertures 110 formed in the lid 104, although other securement means known in the art may also be utilized without departing from the broader aspects of the present invention.

With reference to FIGS. 8-11, a removable cover 112 may be secured to the lid 104 over the feed tube opening 106, in place of the removable feed tube 108 during certain processing operations. The cover 112 is generally planar in configuration and may be selectively attached to the lid 104 via pins provided through the locating and anchoring apertures 110, as described above, although other securement means known in the art may also be utilized without departing from the broader aspects of the present invention. As further shown therein, the cover 112 may include a removable knob or plug 114 which can be selectively removed by a user to gain access to the interior of the work bowl 102 for adding liquids and the like.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A food processor, comprising:
a base;
a motor disposed within said base;
an output shaft operatively connected to said motor and extending outwardly from said base, said output shaft being rotatable around an axis upon actuation of said motor;
a work bowl received on said base;
a lid removably received by said work bowl, said lid having a feed tube opening formed therein and one of a tongue or groove bordering said feed tube opening; and
a feed tube releasably connected said lid, said feed tube including a generally annular body defining a passageway therethrough, said passageway being in communication with said feed tube opening when connected to said lid, said feed tube having a corresponding other of the tongue or groove adjacent to a bottom of said feed tube;
wherein said feed tube is connected to said lid when said tongue or groove of said feed tube is slidably received by the other of said tongue or groove of said lid in a direction perpendicular to said axis.

2. The food processor of claim 1, wherein:
said feed tube includes said tongue and the lid includes said complimentary groove.

3. The food processor of claim 2, wherein:
said tongue is a pair of tongues on opposing sides of said feed tube; and
said groove is a pair of grooves formed in opposing sides of said feed tube opening.

4. The food processor of claim 1, wherein:
said lid includes a plurality of anchoring apertures arranged about said feed tube opening; and
said feed tube is configured to be secured to said lid via a plurality of pins provided through said anchoring apertures.

5. The food processor of claim 1, further comprising:
a removable cover configured to be releasably connected to said lid and to close off said feed tube opening.

6. The food processor of claim 5, wherein:
said cover includes a corresponding other of the tongue or groove;
wherein when said cover is connected to said lid in place of said feed tube, said tongue or groove of said cover is slidably received by the other of said tongue or groove of said lid.

7. The food processor of claim 5, wherein:
said lid includes a plurality of anchoring apertures arranged about said feed tube opening; and
said cover is configured to be secured to said lid via a plurality of pins provided through said anchoring apertures.

8. The food processor of claim 5, wherein:
said cover includes a removable plug.

9. The food processor of claim 1, wherein:
said work bowl is removably received on said base.

10. The food processor of claim 1, wherein:
said feed tube has a cross-sectional shape that is substantially similar to a peripheral shape of said feed tube opening.

11. A food processor, comprising:
a base;
a motor disposed within said base;
an output shaft operatively connected to said motor and extending outwardly from said base, said output shaft being rotatable about an axis upon actuation of said motor;
a work bowl received on said base;
a lid removably received by said work bowl;
a feed tube releasably connected said lid;
wherein said feed tube is slidable in a direction orthogonal to said axis when being selectively mated to or removed from said lid.

* * * * *